US009808025B2

(12) United States Patent
Wolf et al.

(10) Patent No.: US 9,808,025 B2
(45) Date of Patent: Nov. 7, 2017

(54) FILM-COATING APPARATUS

(75) Inventors: Michael Lothar Wolf, Lemgo (DE); Jorg Kutschke, Lage (DE)

(73) Assignee: Lothar A. Wolf Spezialmaschinen GmbH, Bad Salzuflen (DE)

( * ) Notice: Subject to any disclaimer, the term of this patent is extended or adjusted under 35 U.S.C. 154(b) by 922 days.

(21) Appl. No.: 14/116,926

(22) PCT Filed: May 3, 2012

(86) PCT No.: PCT/EP2012/058069
§ 371 (c)(1),
(2), (4) Date: Jan. 27, 2014

(87) PCT Pub. No.: WO2012/152636
PCT Pub. Date: Nov. 15, 2012

(65) Prior Publication Data
US 2016/0309735 A1    Oct. 27, 2016

(30) Foreign Application Priority Data

May 9, 2011 (DE) .......... 10 2011 075 535

(51) Int. Cl.
*A23G 3/26* (2006.01)
*B05C 13/02* (2006.01)
(Continued)

(52) U.S. Cl.
CPC ............. *A23G 3/2092* (2013.01); *A23G 3/26* (2013.01); *B05B 12/00* (2013.01)

(58) Field of Classification Search
USPC ... 118/13, 19, 20, 21, 24, 303, 304, 324, 62, 118/63
See application file for complete search history.

(56) References Cited

U.S. PATENT DOCUMENTS

| 2,308,420 A | 1/1943 | Hoopes |
| 3,875,894 A * | 4/1975 | Steinberg ................ A23G 3/26 |
| | | 118/19 |
| 3,915,120 A | 10/1975 | Terry |

FOREIGN PATENT DOCUMENTS

| AT | 288843 | 3/1971 |
| DE | 6603208 U | 8/1969 |

(Continued)

OTHER PUBLICATIONS

European Patent Office, Search Report and Written Opinion issued in International Application No. PCT/EP2012/58069 dated May 3, 2012.

(Continued)

*Primary Examiner* — Yewebdar Tadesse
(74) *Attorney, Agent, or Firm* — Wood Herron & Evans LLP (57) ABSTRACT

The invention relates to a film-coating apparatus (1) for coating foods with a coating material, more particularly with sugar solution or with a solution based on sugar substitute, having a housing (2), a coating chamber (9) within the housing (2), in which a delivery means (6) for delivering the coating material can be placed, and having a circulating belt (3) which in sections forms part of the walls of the coating chamber (9) and is provided as a bearing surface for the foods. The invention relates more particularly to a film-coating apparatus in which the belt (3) has a multiplicity of gas ports (30) which are designed for the accelerated solidification of the coating material.

23 Claims, 7 Drawing Sheets

(51) Int. Cl.
*A23G 3/20* (2006.01)
*B05B 12/00* (2006.01)

(56) References Cited

FOREIGN PATENT DOCUMENTS

| DE | 2139154 A1 | 2/1973 |
|----|------------|--------|
| DE | 2323853 A1 | 11/1974 |
| DE | 2759288 C2 | 11/1982 |
| DE | 8814224 U1 | 2/1989 |
| DE | 19630954 A1 | 2/1998 |

OTHER PUBLICATIONS

European Patent Office, International Search Report issued in International Application No. PCT/EP2012/58069 dated Aug. 8, 2012.
German Patent Office, Examination Reportion issued in German Application No. 10 2011 075 535.7 dated May 7, 2012.

\* cited by examiner

FILM-COATING APPARATUS

TECHNICAL FIELD

The invention relates to a film-coating apparatus for coating foods with a coating material, more particularly with a sugar solution or with a solution based on sugar substitute, having a housing, a coating chamber within the housing, in which a delivery means for delivering the coating material can be placed, and having a circulating belt which in sections forms part of the walls of the coating chamber and is provided as a bearing surface for the foods.

BACKGROUND

Different types of film-coating apparatus are used in the sweets industry for producing confectionary products with a coating, e.g. a chocolate or sugar coating or with a sugar-free coating. Such sugar-free coatings contain, for example, the sugar substitute sorbitol or maltitol.

A known film-coating apparatus is one where the foods to be coated, e.g. nuts, raisins or puffed rice, are lying on a circulating belt and are continuously being mixed by the belt, while, above the belt, a coating nozzle sprays the coating in liquid form on the sweets. The coating may consist of several thin layers which are applied on the foods one after the other. Different coating materials are known, for example sugar solution or chocolate. However, new layers can only be applied once the previous layer of the coating material has solidified. This means that, for example, one layer of a chocolate coating has to have cooled down or respectively that a layer of sugar coating has to have dried.

The solidification (cooling or respectively drying) of the coating determines the duration of the production significantly. In the case of sugar coatings, so far, it has been possible to reduce the drying time of the sugar solution by increasing the sugar content. However, this has the disadvantage that the risk of unintended crystallization increases in sugar solutions with a higher sugar content. In an extreme case, the sugar solution will crystallize even though the temperature is still close to the boiling point. In addition, an increased wear of the belt will occur and thus an increase of the maintenance efforts. This has to be regarded as a limitation of the production efficiency.

Therefore, it is the object of the invention to present a film-coating apparatus with a circulating belt by means of which an improvement of the production efficiency can be achieved.

SUMMARY

According to a first aspect of the solution, the object is achieved through a film-coating apparatus of the above referenced type, by providing that the belt comprises a multiplicity of gas ports designed for a faster solidification of the coating material.

Thus, an especially fast solidification of the coating material as compared to a film-coating apparatus that does not comprise any respectively dimensioned gas ports is possible. New layers of the coating material can be applied one after another at shorter time intervals so that the last exterior layer is reached faster and the production time or respectively coating time of the foods is reduced without the need to use, for example, sugar solutions with such a high sugar concentration that an early crystallization is imminent.

The gas ports make it possible to conduct heat and moisture from the coating chamber and, thus, accelerate the solidification of the coating material. The temperature and moisture content in the gas within the coating chamber are thus effectively decreased. In addition, a flow arises at the gas ports due to the exiting gas, which is beneficial for the cooling and drying of the coating material. To this end, the gas ports are dimensioned in such a way that, during the operation of the apparatus, a volume of gas sufficient for an increased solidification is always exiting through the gas ports. The exiting of the gas occurs due to the difference in temperature between the coating chamber and the air outside the coating chamber as well as due to the movement of the belt. Preferably, the gas ports are dimensioned in such a way that even smaller foods do not fall through the gas ports or get stuck in them.

The circulating belt forms in sections part of the walls of the coating chamber. One section of it runs on the inside and one section of it on the outside of the coating chamber. Through the gas ports of the belt, the coating chamber has a flow connection to a volume for accepting the gas outside the coating chamber, preferably to the ambient air. The belt comprises a bearing surface for the foods to be coated and is designed in such a way that the foods are mixed due to the movement of the belt.

The foods are foods with a size between several millimeters and several centimeters. This includes in particular any kind of nuts, raisins, coffee beans, puffed rice or tablets.

The coating material is adapted to adhere to the foods and is, in order to be applied to the foods, first of all liquefied so that it can be applied to the foods, for example sprayed on them. The coating material can comprise a single material, such as chocolate, as well as several materials in a solved state, such as sugar solution.

Sugar solutions contain different types of sugar, such as glucose or refined sugar. After their application to the foods, they are solidified through the withdrawal of liquid, e.g. they are dried, and, at room temperature, their physical as well as their chemical state is consistent. Due to the option of an accelerated solidification of the coating material by means of the gas ports, the use of sugar solutions with a relatively low sugar content is also possible under economically acceptable conditions.

An embodiment of the apparatus according to the invention where the gas ports are respectively designed as straight lines is advantageous. This shape of the gas ports is especially favorable for the flow and enables the exit of higher gas volumes through the gas ports. In the direction of their oblong extension, the gas ports respectively comprise two limitations which are straight-lined and parallel to each other.

The apparatus according to the invention is further developed through another advantageous embodiment, where the gas ports extend in the direction of the longitudinal axis respectively over the entire width of the coating chamber. Thus, the exit of the gas occurs over the entire width of the coating chamber. At each place along the width of the coating chamber, the coating material can be solidified in an accelerated manner. Essentially, the gas ports extend entirely from one side wall to the other side wall of the coating chamber. Maximum use is made of the width of the coating chamber. The longitudinal axis of the gas ports corresponds to the center line along the direction of the oblong extension of the respective gas ports.

Preferably, an embodiment of the apparatus according to the invention comprises gas ports, respectively with a width in the range from 0.8 mm to 3 mm. According to this embodiment, the gas ports have a size that makes it possible to use the belt for a multiplicity of different foods and, at the same time, enables an accelerated solidification of the coating material. It is further preferred, that the width is in a range between 1 mm and 3 mm. Especially preferably, the width is in a range between 1 mm and 2 mm.

Preferably, the apparatus according to the invention comprises gas ports, the longitudinal axes of which are respectively arranged transversely to the running direction of the belt. This embodiment enables an equal distribution of the foods on the belt in the direction of the width and, in addition, can be manufactured particularly easy.

The apparatus according to the invention is further developed through an advantageous embodiment, where the distances between two neighboring gas ports in the running direction of the belt are constant and preferably in a range between 10 mm and 50 mm. The bearing surface of a belt according to these dimensions is particularly advantageous for an even mixing of the foods on the belt, without limiting the accelerated solidification of the coating material. Preferably the distance is in a range between 20 mm and 40 mm. This range constitutes a surprisingly good compromise between a high belt stability and the economics of production on the one hand and a large number of gas ports (high gas flow rate) on the other.

Another preferred embodiment of the apparatus according to the invention is further developed through edges of the opening cross-section that are rounded. The rounding of the edges leads to a reduction of the flow resistance for the gas exiting through the gas ports as well as, in particular, to a gentle treatment of the foods lying on the belt. Preferably, the rounding radius is in the range between 2 mm and 4 mm.

Preferably, the circulating belt comprises two belts which respectively run along the edges of the belt and onto which a multiplicity of cross struts with a distance between each other is mounted. Thus, a belt with particularly low maintenance requirements can be manufactured in a particularly easy manner. Each belt is designed in the shape of the belt and circulating in the running direction of the belt. The belts are respectively arranged at the open edges or respectively ends of the circulating belt in transverse direction. A multiplicity of cross struts is mounted to the belts, wherein the cross struts are spaced in such a way that they can be moved around the entire belt without touching each other. The cross struts comprise a bearing surface for the foods. Preferably, individual cross struts can be replaced separately, which simplifies the manufacture and the maintenance of the belt.

A further development of an advantageous embodiment of the apparatus according to the invention is that the belts are respectively designed as one piece. This embodiment can be operated with particularly low wear and low maintenance. The one-piece embodiment does not require joints and prevents the accumulation of the coating material, such as sugar, within the belt. A wear of the belt as a result of abrasion, as it occurs in joints, is thus effectively prevented.

Furthermore, the film-coating apparatus comprises cross struts which are rigidly mounted to the belt, relative to a corresponding mounting section. The cross struts are mounted to the strut, relative to the corresponding mounting section, in such a way that no movement is allowed in order to prevent a wear due to the relative movements of both parts. Furthermore, in the area of the mounting section, the gap between a cross strut and the belt is designed in such a way that sediments of the coating material in the gap can be mostly prevented. Thus, abrasive wear is effectively prevented.

An advantageous embodiment of the apparatus according to the invention is further developed in such a way that each cross strut comprises a sheet metal element. By means of this embodiment, the manufacture of a durable and stable belt can be realized with little material expenditure and, thus, with a small weight. The sheet metal elements lead to a reduced deflection of the cross struts and to lower operating costs. Alternatively, it is preferred that each cross strut comprises a plastic element. This leads to a further reduction of the own weight, but, in this case, limitations of the cross struts with regard to the rigidity in relation to the material thickness of the element are to be accepted.

A preferable and advantageous embodiment of the apparatus according to the invention is characterized by a delivery means for delivering the coating material onto the foods with a delivery nozzle installation and a protective tube enclosing the delivery nozzle installation, wherein the protective tube comprises one or several outlets which can be arranged in alignment with the delivery nozzle installation for delivering the coating material. Preferably, the delivery nozzle installation is entirely enclosed by the protective tube and, thus, an effective protection of the delivery nozzle installation from dirt and other contamination is achieved. For the delivery of the coating material, the outlet or respectively outlets of the protective tube can be arranged, pivoted or moved in relation to the delivery nozzle installation. In addition, the outlet of the protective tube can be closed in order to protect the delivery nozzle installation form external influences not connected to the operation of the apparatus.

Especially advantageous is an embodiment of the apparatus according to the invention where the delivery means comprises a cleaning nozzle installation mounted to the protective tube for cleaning the delivery nozzle installation, wherein, for cleaning, the delivery nozzle installation can be pivoted into a cleaning position. Thus, a particularly easy maintenance of the delivery means with short maintenance times is achieved. For cleaning, a cleaning agent is applied to the delivery nozzle installation by means of the cleaning nozzle installation. Cleaning agents are, for example, water, pressurized air or other cleaning liquids. Preferably, the delivery nozzle installation can be pivoted into a cleaning position so that, due to gravity, the cleaning agent drips down from the delivery nozzle installation. Preferably, the delivery nozzle installation has a horizontal orientation when it is in the cleaning position. Furthermore, it is preferred that the outlet or the outlets of the protective tube are closed during the cleaning of the delivery nozzle installation or that they are in a position that prevents leaking of the cleaning agent.

According to another advantageous embodiment of the apparatus according to the invention, on an inside of the protective tube, the outlet comprises a projection designed as a liquid barrier. The projection effectively prevents condensed liquid or liquid running from the cleaning nozzle installation within the protective tube from reaching the coating chamber through the outlet.

According to another preferred embodiment of the apparatus according to the invention, in the direction of its oblong extension, the protective tube is, at least in some sections, angled to a horizontal axis and thus makes a particularly easy disposal of the cleaning agent possible. The incline is arranged in such a way that the cleaning agent drains off to one side of the protective coat. Preferably, the protective tube is connected with a siphon or respectively a collecting container for receiving the cleaning agent.

Furthermore, an advantageous embodiment of the apparatus according to the invention has a belt comprising a multiplicity of drivers for gripping the objects. The drivers enable a particularly good mixing of the foods on the belt and improve the evenness of the distribution and solidification of the coating material. Preferably, the drivers are designed in the form of hooks or pins, have a U-shaped or L-shaped design or are designed as metal sheets or projections.

Another preferred embodiment of the apparatus according to the invention comprises cross struts coated with an adhesion-reducing, in particular lipophobic and/or hydrophobic, material. By means of this embodiment, residues of the coating material or of the foods on the cross struts can be reduced. Thus, the cleaning of the belt is made easier. Particularly preferably, the coating is also oleophobic. Preferably, the coating has a microscopic or nanoscopic structure with lotus effect characteristics.

Another advantageous embodiment according to the invention comprises at least one supporting element for supporting the belt in a deflection area of the belt. The supporting element increases the stability of the coating chamber and is arranged in such a way that vibrations and/or a deflection of the belt due to the weight of the foods are minimized. The arrangement of the supporting elements in the deflection area of the belt leads to particularly stable and low-vibration running characteristics of the belt in the area of the coating chamber, in which the product is mostly located during operation.

The invention achieves the underlying object pursuant to a second aspect of the invention in the case of a film-coating apparatus of the above mentioned type by providing a feeding device for feeding process gas into the coating chamber.

The feeding of process gas into the coating chamber makes it possible to perform the solidification of the coating material in a particularly accelerated manner. The feeding device ensures a forced, increased convection of the process gas all the way through the gas ports and through the product to be coated. Where needed, the moisture or respectively temperature of the gas in the coating chamber is reduced through a targeted, pre-adjustable supply of process gas.

The film-coating apparatus pursuant to the second aspect of the invention can also be used with a belt that does not comprise any gas ports. Film-coating apparatus with a feeding device can be retrofitted in this manner. A combination of the first and the second aspect of the invention is particularly preferable.

The process gas may optionally be (processed) air or another suitable gas, such as noble gas or nitrogen.

An advantageous embodiment of the apparatus according to the invention comprises a venting device for discharging a gas prevailing within the coating chamber which interacts with the feeding device in order to create a flow within the coating chamber. By means of this embodiment, a particularly high controllability of the solidification process and of the solidification speed as well as a high operational efficiency are achieved. Through the venting device, the gas within the coating chamber can be actively discharged or respectively dispensed. The active venting of the gas from the coating chamber leads to an increased gas flow through the gas ports, by means of which the coating material can be solidified particularly fast. Furthermore, the venting device makes it possible to direct the process gas to a processing installation and to reuse it.

Preferably, the venting device is pivotable in such a way that the feeding device of the coating chamber feeds in the process gas in a first direction, and that the venting device discharges the gas in the coating chamber from the coating chamber in the first direction, or, alternatively, in a second direction. By means of this embodiment, different flow configurations within the coating chamber can be variably adjusted. To this end, the venting device is pivotable in such a way that the inlet of the venting device is angled relative to the outlet of the feeding device.

Preferably, the belt comprises a multiplicity of gas ports and the venting device is arranged outside the coating chamber in the vicinity of the gas ports. The venting device is located in the vicinity of the gas ports, which are arranged inside the coating chamber.

Preferably, the feeding device comprises an oblong outlet, the length of which corresponds approximately to the width of the coating chamber. Thus, a particularly even supply of process gas essentially over the entire width of the coating chamber of the belt is achieved.

BRIEF DESCRIPTION OF THE DRAWINGS

In the following, the invention is described by means of an exemplary embodiment and drawings. The following is shown in.

DETAILED DESCRIPTION

Figure 1:
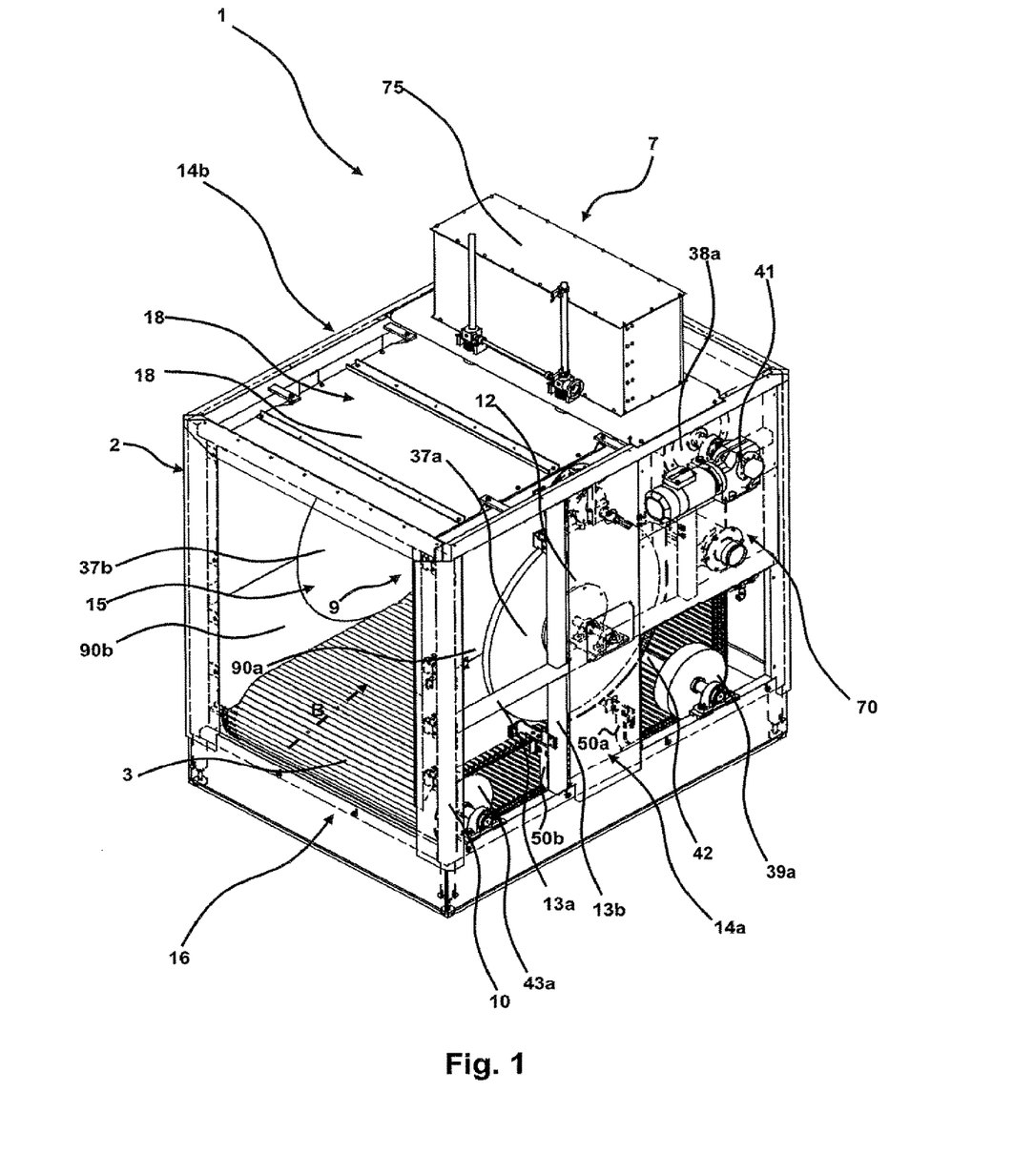
FIG. 1 a perspective overall view of an exemplary embodiment of the film-coating apparatus according to the invention with the housing partially removed.

FIG. 1 shows a film-coating apparatus 1 for coating foods with a coating material, more particularly with sugar solution. Alternatively, coating with chocolate is also possible. The apparatus comprises a housing 2 with a coating chamber 9 within the housing 2. A delivery means 5 (cf. FIG. 2) for delivering the coating material is placed or respectively arranged in the coating chamber 9. The apparatus 1 further comprises a circulating belt 3 which in sections forms part of the walls of the coating chamber 9 and is provided as a bearing surface for the foods. The belt 3 has a multiplicity of gas ports 30 (cf. FIG. 6, there shown three times by way of example) which are designed for the accelerated solidification of the coating material. Furthermore, a feeding device 7 for feeding process gas into the coating chamber 9 is arranged within the coating chamber 9. The feeding device 7 interacts with a venting device 70 for discharging a gas prevailing within the coating chamber 9 in order to create a flow within the coating chamber 9.

Figure 2:
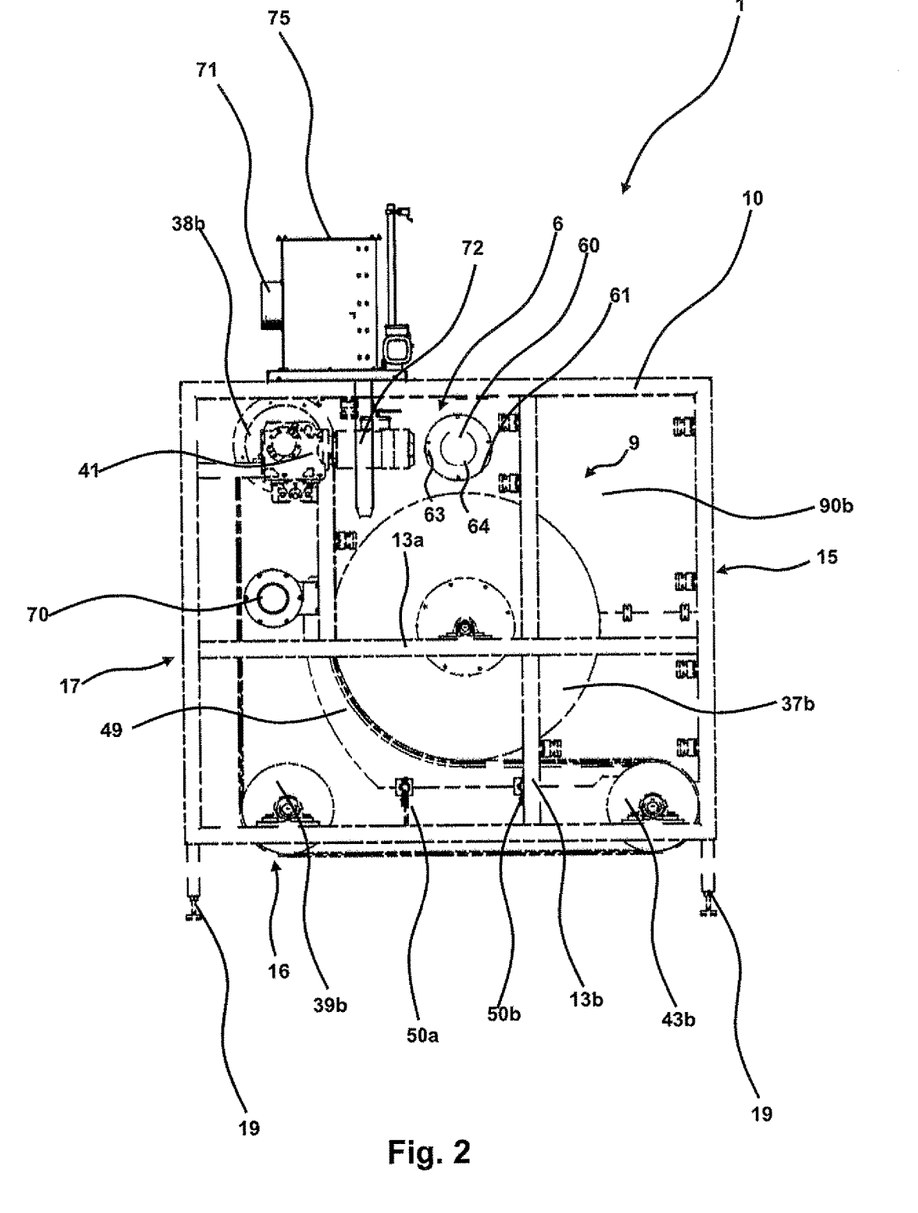
FIG. 2 a side view of the exemplary embodiment.

The housing 2 is constructed of a framework 10 with a multiplicity of rod elements arranged in the form of a cuboid. On the outside, the framework is covered with cover elements 12. In FIGS. 1 and 2, the cover elements 12 are only rudimentarily illustrated. On the one hand the rod elements serve to increase the rigidity of the housing 2, and on the other they serve as bearing elements for the installations installed within the housing 2.

On two lateral sides 14a, 14b of the housing 2, the framework 10 has cross struts 13a, 13b respectively arranged horizontally and vertically between the rod elements. A horizontal cross strut 13a is respectively arranged approximately at mid-height of the housing 2 and runs in horizontal direction across the entire lateral side 14a, 14b of the housing 2. Furthermore, a vertical cross strut 13b runs respectively in vertical direction across the entire lateral side 14a, 14b of the housing 2.

In addition, the housing 2 comprises a front side 15, via which the coating chamber 9 can be accessed. The front side 15 comprises a free open space to enable unobstructed access to the coating chamber 9 (not shown in the Figures). The film-coating apparatus 1 comprises doors for opening and closing the coating chamber 9 on the front side 15. The design of the doors is not restricted to a certain type, but depending on the use situation, may, for example, be a one-piece, two-piece, vertically or horizontally pivotable design. The doors can respectively be pivotably mounted to the rod elements of the framework 10.

Furthermore, the housing 2 comprises a bottom side 16 with several foot elements 19 for bearing the housing 2. The foot elements 19 are respectively located at the corners of the bottom side 16. Their height is adjustable in order to enable an even position of the apparatus. Preferably, the height of the individual foot elements 19 can be adjusted independently from the height of the other foot elements in order to balance any unevenness of the ground.

On the inside, the housing 2 is covered in sections at a ceiling side 18 and at the lateral sides 14a, 14b with several cover elements 90a, 90b, 90c. Together with the belt 3 and two disks 37a, 37b, the cover elements 90a, 90b, 90c form the walls of the coating chamber 9. The width of the coating chamber 9 essentially corresponds to the width of the housing 2. Towards the front side 15, the belt 3 is arranged in the area of the bottom side 16. Thus, the entire height of the interior of the housing 2 is filled by means of the coating chamber 9 and the belt 3. In the area of a back side 17 of the housing 2, opposite to the front side 15, belt 3 runs in sections parallel to the back side 17. The belt 3 is located in close vicinity to the back side 17 in order to use the interior space of the housing 2 in longitudinal direction as much as possible.

The cover elements 90a, 90b at the lateral sides 14a, 14b respectively have a two-piece design. Furthermore, the cover elements 90a, 90b are essentially cut out to precisely fit the disks 37a, 37b and the belt 3. The distances between the cover elements 90a, 90b and the belt 3 or respectively the disks 37a, 37b are dimensioned in such a way that contact between the parts is prevented. Furthermore, the distance also ensures that no foods fall out of the coating chamber through the gaps.

Towards the ceiling side 18, the coating chamber 9 is completed by means of several sheet metal elements 90 that are bolted together. The cover elements 90 have a recess for the arrangement of a process gas outlet 71 of the feeding device 7 in the coating chamber 9.

The coating elements 90a, 90b, 90c are designed in such a way that leaking of the gas out of the coating chamber 9 through the walls is mostly prevented. Thus, the gas is forced to exit through the gas ports 30 of the belt 3.

The belt 3 serves as a bearing surface and to mix the foods within the coating chamber 9. The belt 3 is designed in such a way that one section of it runs in a first direction in the coating chamber 9, where the foods are lying on the belt in an evenly distributed manner. Furthermore, another section of the belt runs in a second direction in the coating chamber 9 so that, in this section, the foods roll away from the belt and move in the opposite direction of the running direction B of the belt 3. Thus, the foods on the belt 3 are continuously being mixed. In this exemplary embodiment, the first running direction has a horizontal orientation and the second direction a vertical orientation. A positioning of the sections at alternative angles to each other would also be conceivable.

In the coating chamber 9, in a first deflection area, the belt 3 is deflected from the first direction to the second direction by means of the disks 37a, 37b. The radius of the disks 37a, 37b is dimensioned in such a way that a mixing of the foods is ensured. Compared to the drive rolls 38a, 38b and the deflection rolls 39a, 39b, 43a, 43b, which serve to deflect the belt 3, the radius of the disk is multiple times larger than the radius of said rolls 38a, 38b, 39a, 39b, 43a, 43b. The disks 37a, 37b are pivotably arranged on the horizontal cross strut 13a, approximately at the center, so that the deflection of the belt 3 starts approximately in the middle of the longitudinal direction of the housing 2 and is completed after a distance in longitudinal direction corresponding to the radius of the disk 37.

Figure 3:
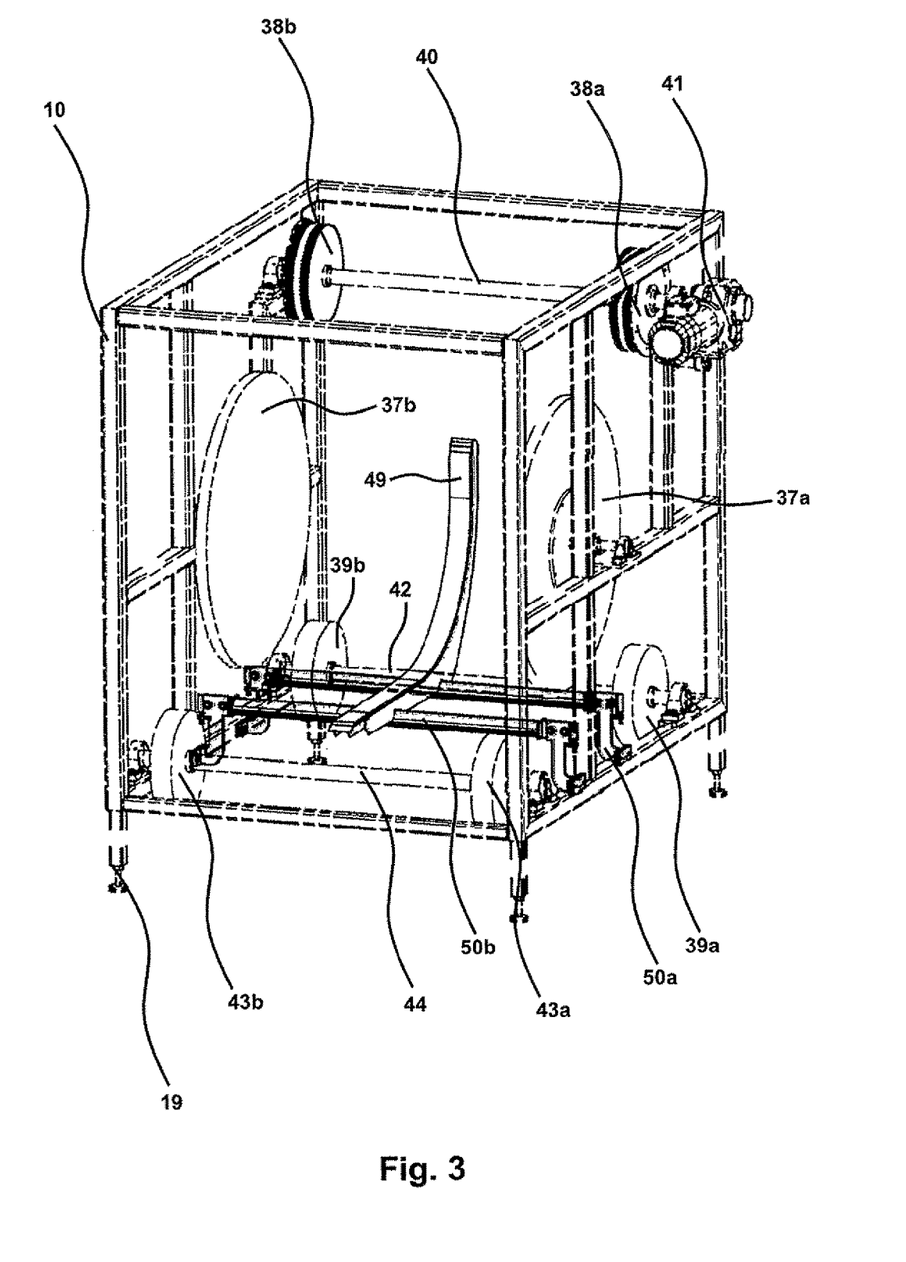
FIG. 3 a perspective view with the illustration of sections of the exemplary embodiment, FIG. 4 a perspective view of the feeding and venting devices of the exemplary embodiment, FIG. 5 a top view of a section of the belt of the exemplary embodiment, FIG. 6 a perspective view of a section of the belt of the exemplary embodiment, FIG. 7 a front view of a cross strut of the belt, FIG. 8 an enlarged view of the middle section of the cross strut of FIG. 7, FIG. 9 an enlarged side view of the edge area of the belt, and FIG. 10 an enlarged side view of the middle section of the cross strut of FIG. 9.

As shown in FIGS. 2 and 3, a supporting element 49 for supporting the belt is located in the first deflection area. The supporting element 49 has the shape of a circular arc, the radius of which essentially corresponds to the radius of the disks 37a, 37b. The supporting element 39 is arranged in an interior space enclosed by the belt 3, between the sections running on the outside and on the inside of the coating chamber 9. Furthermore, the supporting element is arranged approximately in the center of the width of the housing 2 in the first deflection area. Two bearing structures 50a, 50b for bearing the supporting element 49 are mounted transversally between the rod elements at the lateral sides 14a, 14b at the bottom side 16 of the housing. The side view of FIG. 2 shows that the supporting element 49 has a larger thickness in its center area than at the end areas. The thickness of the supporting element 49 depends on the maximum load the supporting element 49 is subject to due to the foods on the belt 3.

In the area of the ceiling side 18, the belt 13 is driven and deflected by means of drive rolls 38a, 38b. The drive rolls 38a, 38b comprise toothing for driving the belt 3. At the drive rolls 38a, 38b, the belt is deflected by around 180° and runs out of the coating chamber 9. From there, the belt runs outside the coating chamber 9 in the second direction towards the bottom side 16 of the housing. Alternative embodiments provide a deflection or respectively wrap angle of the belt 3 around the respective drive roll 38a, 38b in the scope between 160° and 190°.

The drive rolls 38a, 38b are designed as gear wheel disks and are respectively arranged at the lateral sides 14a, 14b. The drive rolls 38a, 38b are connected with each other by a shaft 40, wherein the shaft 40 is coupled with a drive installation 41. Thus, it is ensured that both rolls drive the belt 3 evenly. The drive installation 41 is located at the exterior wall of the lateral side 14a.

First deflection rolls 39a, 39b, through which the belt 3 is deflected from the second to direction to the first direction outside the coating chamber 9, are located next to the corner area between the bottom side 16 and the back side 18. The deflection rolls 39a, 39b are arranged relative to the housing 2 in such a way that the belt 3 runs in close vicinity to the bottom side of the housing 2. The first deflection rolls 39a, 39b are also connected with each other by means of a shaft 42 and ensure the even deflection of the belt 3.

Second deflection rolls 43a, 43b are arranged at the front side 15 in the area of the bottom side 16. By means of the second deflection rolls 43a, 43b, the belt 3 is deflected by around 180° into the coating chamber 9 (alternative embodiments as described above). In the illustrated exemplary embodiment, the second deflection rolls 43a, 43b are arranged at the same height as the first deflection rolls 39a, 39b. Optionally, the first deflection rolls 39 and the second deflection rolls can be arranged at different heights in order to obtain a desired deflection or respectively wrap angle. A shaft 44 connects the second deflection rolls 43a, 43b with each other in order to ensure an even deflection of the belt 3. The first and the second deflection rolls 39a, 39b, 43a, 43b have identical radii. The radius of the drive rolls 38a, 38b essentially corresponds to the radius of the deflection rolls 39a, 39b, 43a, 43b.

The belt 3 comprises two belts 33a, 33b which respectively run along the edges of the belt and onto which a multiplicity of cross struts 34 with a distance between each other is mounted. The outside surfaces of the cross struts 34 facing the coating chamber 9 form the bearing surface of the belt.

Figure 6:
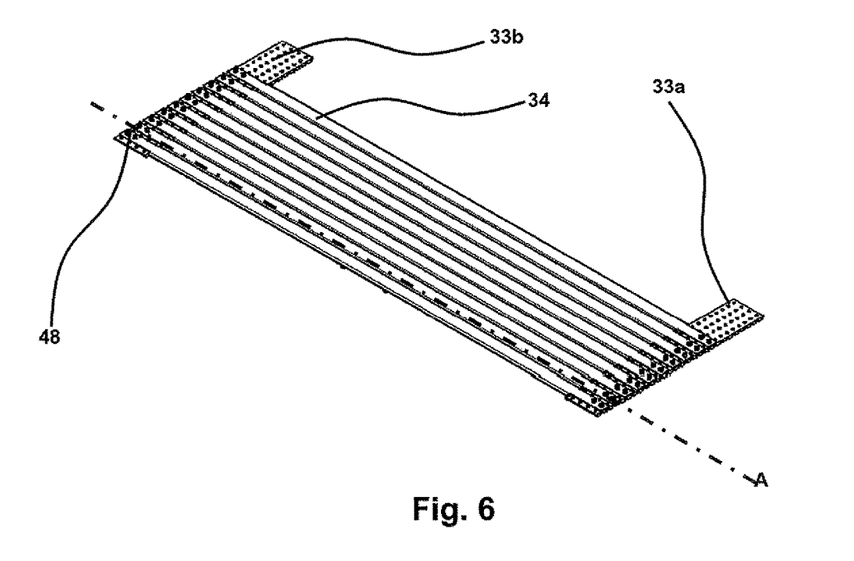
Figure 7:
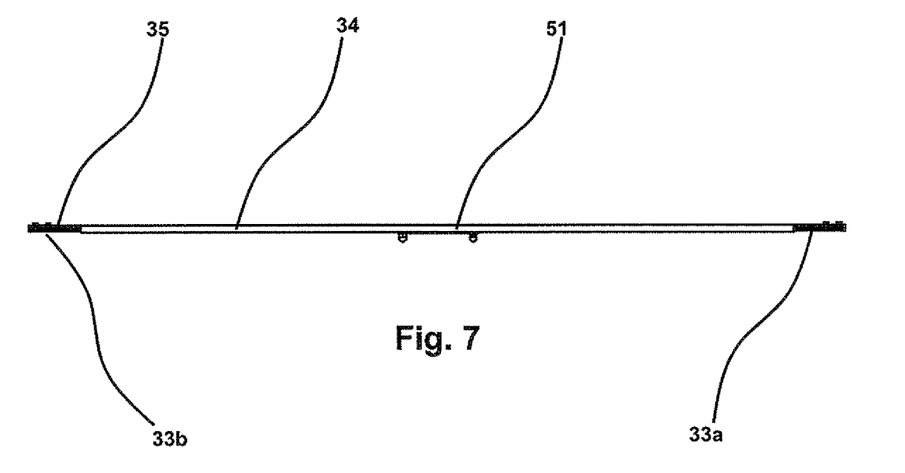
Figure 9:
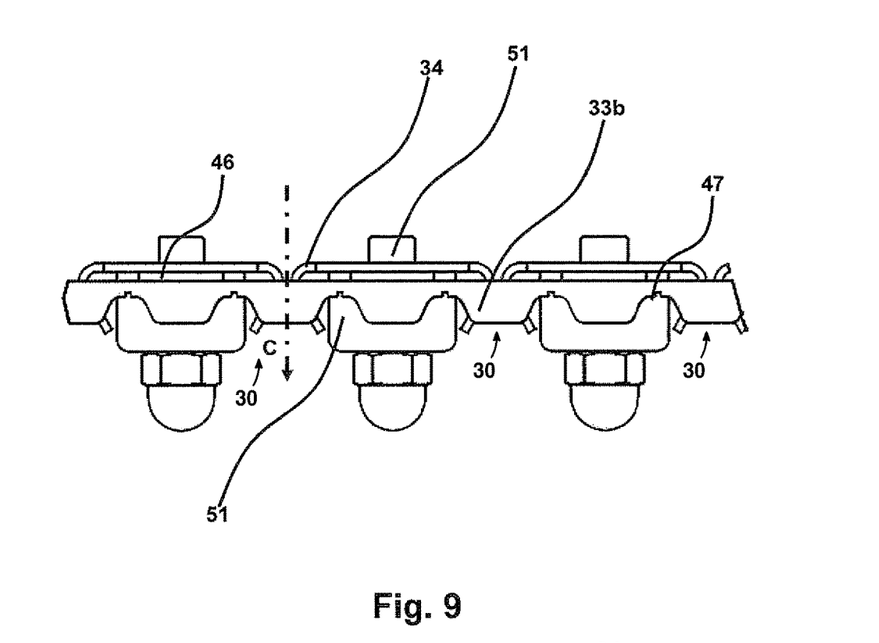

The belts 33a, 33b respectively have a one-piece design and are preferably made of an elastic material. An elastic material comprising a sufficient rigidity for accepting the loads of the foods as well as good damping characteristics is advantageous. As shown in FIG. 9, there are notches 47 on a first side of the belt facing inwards which interact with the drive rolls 38a, 38b for driving the belt 3. A second side of the belt 33a, 33b facing outwards comprises a multiplicity of mounting sections 35 for mounting cross struts. The distance between the individual cross struts 34 provides for the forming of the gas ports 30. The mounting sections 35 respectively have a smooth surface, in which recesses 45, arranged in a row, are realized. As shown in FIGS. 6 and 7, the mounting sections 35 are arranged on the outside of the belt 33a, 33b in narrow strips in parallel to each other and comprise four recesses 45 respectively.

In this exemplary embodiment, the cross strut 34 is realized by means of a connection element. It would also be conceivable to realize the cross struts 34 with a rod element or with a non-metal material. Furthermore, the cross struts 34 are advantageously coated with a non-stick material, such as Teflon.

The cover elements 34 are rigidly mounted to the belt, relative to a corresponding mounting section 35, in such a way that no relative movement occurs between the connection element 34 and the mounting section 35. Advantageously, at its ends, the connection element 34 respectively comprises bridge-shaped sections 48a, 48b. The bridge-shaped sections 48a, 48b have a smaller width than the bearing section of the connection element 34 located between the belts 33a, 33b. The bridge-shaped sections 48a, 48b are respectively positioned on the belts 33a, 33b and are connected with them. A flat nut 46 is respectively arranged between the belts 33a, 33b and the bridge-shaped sections 48a, 48b. Two screws 51 respectively engage with the flat nut 47 and the belt for fastening the connection element 34. Thus, the fastening is realized in a particularly rigid and low wear manner.

Figure 10:
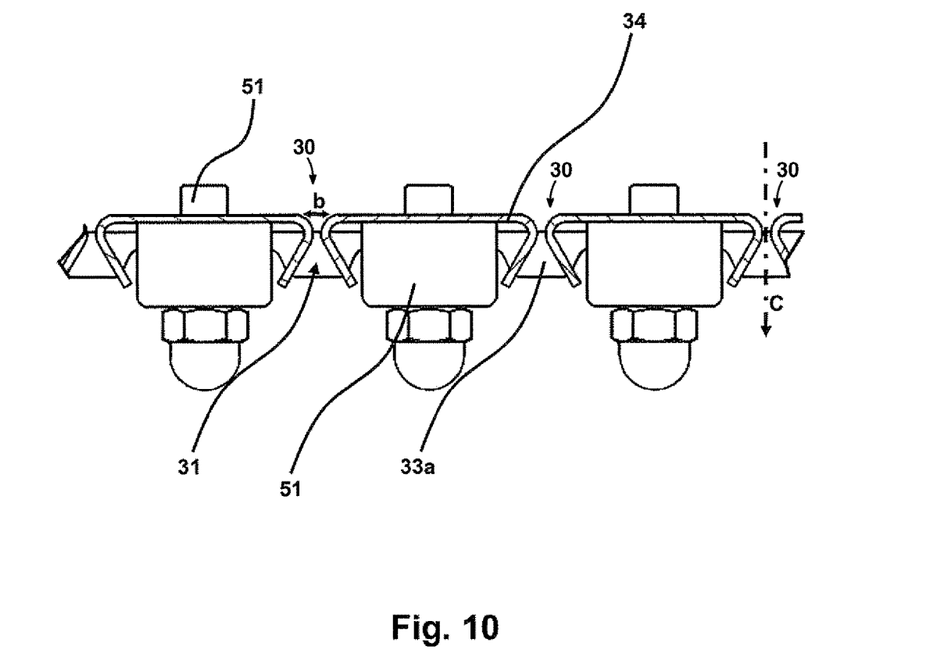

The wider bearing section of the cover element 34 comprises two edge areas in the direction of the longitudinal axis A which are bent away from the bearing section as shown in FIG. 10. The bending is chosen in such a way that a shape of the gas ports 30 as favorable for the flow as possible is achieved and so that, at the same time, the rigidity of the cover elements 34 is increased. The front side of the bent edge areas of the cover elements 34 are respectively adjacent to a side surface of the belt 33a, 33b and increase the rigidity of the belt 3 in transverse direction. Furthermore, the length of the cover element 34 is dimensioned in such a way that the gas ports 30 extend over the entire width of the coating chamber 9. Thus, the belts 33a, 33b are located outside the coating chamber 9.

Figure 8:
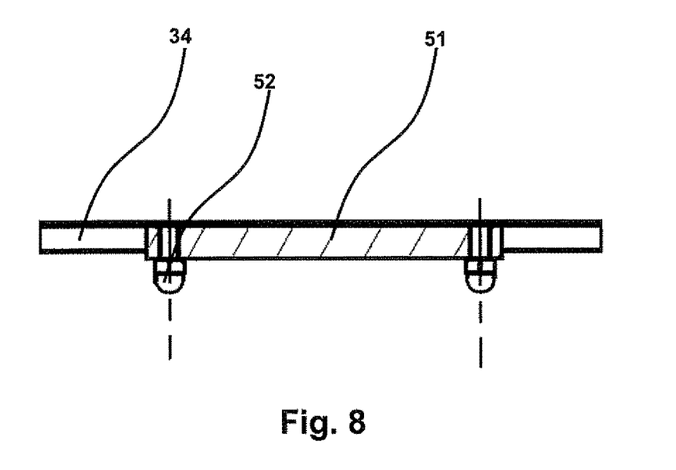

As shown in FIGS. 7 and 8, each connection element 34 is respectively equipped with a supporting disk 51 which interacts with the supporting element 49 for supporting the belt 3 in the first deflection area. The supporting disk 51 has a larger thickness than the connection element 34 in the bearing area. FIG. 10 illustrates the relation of the thicknesses. Thus, contact between the supporting element 49 and the cover element 34 is effectively prevented. The supporting disk 51 is respectively mounted to the cover element 34 by means of bolts 52. The materials of the supporting disk 51 and the supporting element 49 are designed to enable the supporting disk 51 to glide over the supporting element 49 with as little friction as possible. Furthermore, a material is preferred that dampens vibrations of the belt in the first deflection area.

In this exemplary embodiment, the gas ports 30 of the belt 3 are respectively designed as straight lines and extend in longitudinal direction along their longitudinal axes A. Furthermore, the gas ports 30 respectively extend in the direction of the longitudinal axis A over the entire width of the coating chamber 9. In transverse direction, they are limited by the belts 33a, 33b. The longitudinal axes A of the gas ports 30 are arranged transversely to the running direction B of the belt 3.

The gas ports 30 respectively have an opening cross-section 31, which, depending on the flow direction C of the gas flowing through the gas ports, has a tapered or flared design. The flow direction C of the gas runs approximately perpendicularly to the bearing surface of the belt out of the coating chamber 9, as illustrated in FIG. 10. Together with the bent section of a neighboring connection element 34, the cover elements 34 form an opening cross-section 31, which first has a tapered design and subsequently a flared design. In addition, the bent edge areas of the connection element 34 form rounded edges in the area of the opening cross-section 31.

A multiplicity of drivers for gripping the foods, installed on the belt 3, is not shown in the Figures. The drivers are designed as metal sheets or projections, in the form of hooks or pins, U-shaped or L-shaped and serve to transport the foods on the belt 3, in particular against gravity. Depending on the type of food, alternative forms of the drivers would also be conceivable. The drivers are either mounted to the belt 3 ex works, or are equipped with fastening means for a variable mounting and removal. The latter alternative has especially the advantage that the number and position of the drivers on the belt 3 is freely adjustable depending on the situation.

Within the coating chamber 9, a delivery means 6 for delivering the coating material onto the foods is arranged in the area of the ceiling side, as schematically illustrated in FIG. 2. The delivery means 6 has a delivery nozzle installation 60 and a protective tube 61 enclosing the delivery nozzle installation 60. The protective tube 61 comprises an outlet which can be arranged or respectively pivoted in alignment with the delivery nozzle installation 60 for delivering the coating material. The delivery nozzle installation 60 comprises several delivery nozzles, which are arranged on a cylindrical feeding tube 64 along the width of the coating chamber 9 in a row next to each other, and, via them, has a flow connection with a coating material supply. The protective tube 61 is designed as a cylindrical tube, the diameter of which is larger than the one of the feeding tube 64. The two said tubes 61, 64 are arranged coaxially to each other.

The outlet at the protective tube 61 has a circular design, but, according to an optional, preferred embodiment, may also be designed as a slot (not shown in the Figures). Alternatively, the outlet could also be designed as several circular recesses corresponding to the delivery nozzles. On the inside of the protective tube 61, the outlet has a projection which acts as a liquid barrier. It prevents condensed liquid within the protective tube 61 on the inside wall of the protective tube 61 from leaking due to gravity and from exiting to the outside through the outlet.

Furthermore, the delivery means 6 comprises a cleaning nozzle installation 63 mounted to the protective tube 61 for cleaning the delivery nozzle installation, wherein, for cleaning, the delivery nozzle installation 60 can be pivoted into a cleaning position. Preferably, the delivery nozzle installation has a horizontal orientation when it is in the cleaning position.

The cleaning nozzle installation 63 contains several cleaning nozzles which, corresponding to the delivery nozzles 60, are arranged in a row next to each other. The cleaning nozzles are arranged on the protective tube 61 relative to the outlet 62 in such a way that, in the cleaning position, the outlet is above the cleaning nozzles so that no cleaning agent can drain through the outlet due to gravity. Preferably, hot pressurized water is used as cleaning agent. In the direction of its oblong extension, the protective tube 61 is angled to a horizontal axis or inclined towards one end so that the cleaning agent drains towards the lower end. For the disposal of the cleaning agent, the protective tube 61 has a flow connection with a collection container.

Figure 4:
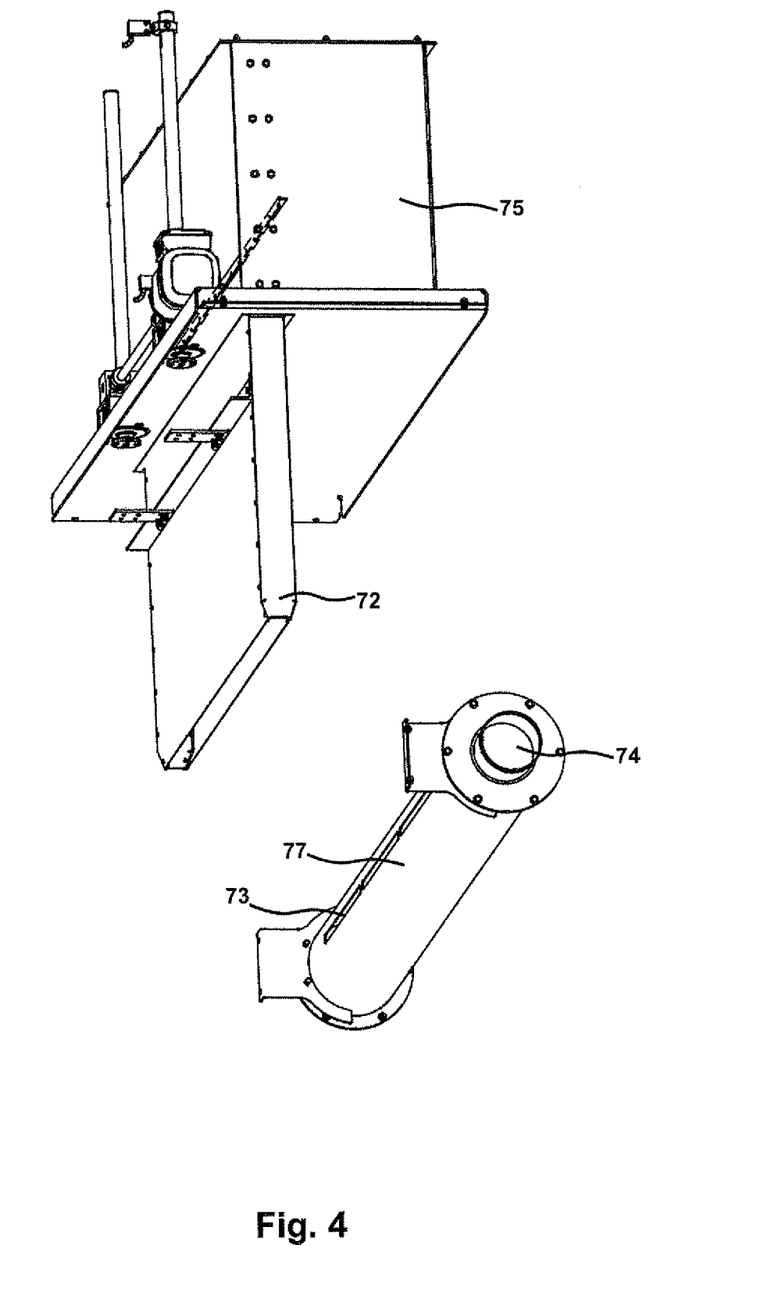
Figure 5:
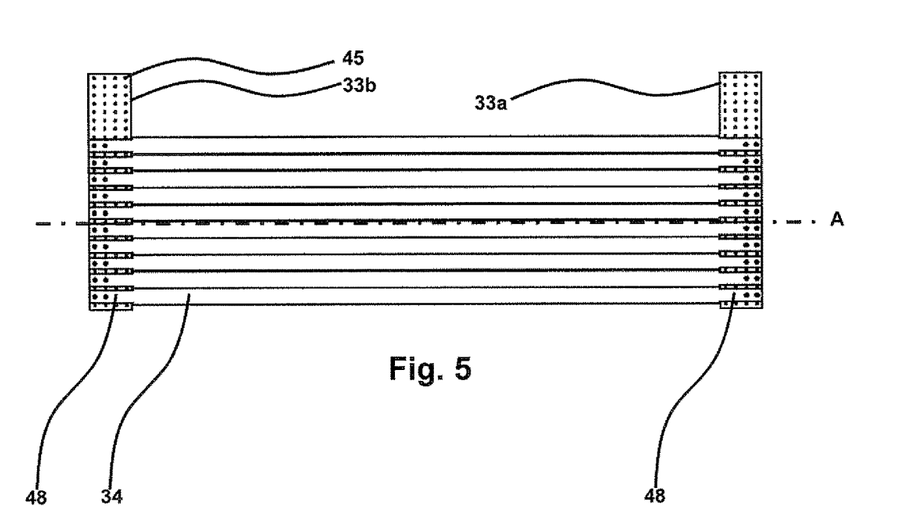

For feeding in process gas, the feeding device 7 is arranged in the coating chamber 9 in the area of the ceiling side adjacently between the delivery means 6 and the drive rolls 38a, 38b. As shown in FIG. 4, the feeding device 7 has a process gas pump arranged within a housing 75 of the feeding device 7. The housing 75 is mounted to the outside wall of the ceiling side 18 of the housing 2. Furthermore, processing installations for conditioning the process gas to the desired characteristics, in particular with regard to moisture and temperature, are located within the housing 75. Furthermore, preferably, a filter system (not shown) is provided, by means of which dirt particles can be removed from the process gas.

The housing 75 comprises a horizontally oriented cylindrical inlet 71 for sucking in fresh air. Alternatively, the inlet can also be connected to a process gas source, which is not shown in the figures. An oblong outlet 72, the length of which corresponds approximately to the width of the coating chamber 9, protrudes from the housing 75. The outlet 72 has a height in order to extend sufficiently deep from the ceiling side 18 into the coating chamber 9. As shown in FIG. 4, the outlet 72 extends vertically from the housing into the coating chamber 9 and feeds the process gas to the foods. Preferably, the outlet is arranged in such a way that the process gas is directed to the first deflection area.

For creating a flow, the venting device 70 is arranged outside the coating chamber 9 in the vicinity of the gas ports 30. It is located at a short distance above the first deflection area in the interior of the belt 3. In the illustrated exemplary embodiment, the venting device 70 comprises three slot-shaped inlets 73 which are arranged on a cylindrical venting channel 77 in a row next to each other. Alternatively, one or respectively two or a multiplicity of inlets is or are provided. The length of the inlets 73 is dimensioned in such a way that, combined, the inlets 73 extend approximately over the entire length of the venting channel 77. The inlets 73 are arranged in the vicinity of the section of the belt 3 running on the inside of the coating chamber 9, above the first deflection area. Furthermore, the inlets 73 are arranged in such way that the gas flows essentially in a horizontally oriented flow direction from the coating chamber 9 into the venting device 70.

An outlet 74 for discharging the gas from the venting device 70 or respectively from the venting channel 77 is located at an axial side of the venting device 70. The outlet 74 is designed by means of a circular recess at the axial side and of an axially protruding projection, and is located outside the housing 2 of the film-coating apparatus 1.

By means of the use of the feeding device 7 and the venting device 70, a flow can be realized within the coating chamber. The arrangement enables, in particular, an increased flow of the gas outside the coating chamber 9 in the area of the first deflection area. The venting device 70 is pivotably mounted. Thus, the flow of the gas can be varied anytime through the pivoting of the venting device 70. Thus, the feeding device 7 of the coating chamber 9 feeds in the process gas in a first direction, and the venting device 70 discharges the gas in the coating chamber from the coating chamber through the gas ports 30 in a second direction, wherein the second direction is variable.

Furthermore, the feeding and venting devices 7, 70 can be controlled in such a way that the volume of the process gas fed in and of the gas discharged are determined depending on one, several or all of the parameters speed of the belt, amount of foods, type of coating material, temperature of the coating material and size of the foods.

The invention claimed is:

1. A film-coating apparatus for coating a food with a coating material, comprising:
    a housing;
    a coating chamber within the housing, the coating chamber configured to receive the coating material; and
    a circulating belt including a plurality of sections with a plurality of cross struts extending from a first side of the circulating belt to a second side of the circulating belt and a plurality of gas ports configured to accelerate solidification of the coating material, the sections partially forming walls of the coating chamber and providing a bearing surface for the food,
    wherein each gas port extends continuously between two adjacent cross struts over an entire width of the coating chamber from the first side of the circulating belt to the second side of the circulating belt.

2. The film-coating apparatus of claim 1 wherein the gas ports are arranged in straight lines.

3. The film-coating apparatus of claim 1 wherein each gas port has a width in a range between 0.8 mm and 3 mm.

4. The film-coating apparatus of claim 1 wherein each gas port has a longitudinal axis transverse to the running direction of the circulating belt.

5. The film-coating apparatus of claim 1 wherein a distance between each adjacent pair of gas ports in a running direction of the circulating belt is constant.

6. The film-coating apparatus of claim 1 wherein each gas port is defined by an opening having edges of rounded cross-section.

7. The film-coating apparatus of claim 1, wherein the circulating belt comprises a first belt, a second belt, and the plurality of cross struts connecting the first belt with the second belt, each adjacent pair of the cross struts spaced apart by a distance.

8. The film-coating apparatus of claim 7 wherein the first belt and the second belt each have a one-piece design.

9. The film-coating apparatus of claim 7 further comprising:
   a first mounting section rigidly mounted each cross strut to the first belt; and
   a second mounting section rigidly mounted each cross strut to the first belt.

10. The film-coating apparatus of claim 7 wherein each cross strut comprises a sheet metal element.

11. The film-coating apparatus of claim 7 wherein each cross strut is coated with an adhesion-reducing material.

12. The film-coating apparatus of claim 1 wherein the circulating belt includes a plurality of drivers configured to grip the food.

13. The film-coating apparatus of claim 1 further comprising:
   at least one supporting element configured to support the circulating belt in a deflection area of the belt.

14. The film-coating apparatus of claim 1 further comprising:
   a feeding device configured to feed a process gas into the coating chamber.

15. The film-coating apparatus of claim 14 further comprising:
   a venting device configured to discharge the process gas from the coating chamber and to interact with the feeding device in order to create a flow within the coating chamber.

16. The film-coating apparatus of claim 15 wherein the venting device is pivotable such that the feeding device feeds in the process gas in a first direction and the venting device discharges the gas in the coating chamber from the coating chamber in the first direction.

17. The film-coating apparatus of claim 15 wherein the venting device is pivotable such that the feeding device feeds in the process gas in a first direction and the venting device discharges the gas in the coating chamber from the coating chamber in a second direction.

18. The film-coating apparatus of claim 15 wherein the venting device is arranged outside the coating chamber and in the vicinity of the gas ports.

19. The film-coating apparatus of claim 15 wherein the feeding device comprises an oblong outlet having a length that corresponds approximately to a width of the coating chamber.

20. A film-coating apparatus for coating a food with a coating material, comprising:
   a housing;
   a coating chamber within the housing, the coating chamber configured to receive the coating material; and
   a circulating belt including a plurality of sections and a plurality of gas ports configured to accelerate solidification of the coating material, the sections partially forming walls of the coating chamber and providing a bearing surface for the food, wherein each gas port extends over an entire width of the coating chamber;
   a delivery device including a delivery nozzle installation configured to deliver the coating material onto the food; and
   a protective tube configured to enclose the delivery nozzle installation, the protective tube including one or more outlets aligned with the delivery nozzle installation for delivering the coating material.

21. The film-coating apparatus of claim 20 wherein the delivery device comprises a cleaning nozzle installation mounted to the protective tube, the delivery nozzle installation configured to clean the delivery nozzle installation and to be pivoted into a cleaning position when cleaning the delivery nozzle installation.

22. The film-coating apparatus of claim 20, wherein each outlet comprises a projection inside of the protective tube, the projection configured to provide a liquid barrier.

23. The film-coating apparatus of claim 20 wherein at least a portion of the protective tube is angled relative to a horizontal axis in the direction of oblong extension.

* * * * *

UNITED STATES PATENT AND TRADEMARK OFFICE
CERTIFICATE OF CORRECTION

PATENT NO. : 9,808,025 B2
APPLICATION NO. : 14/116926
DATED : November 7, 2017
INVENTOR(S) : Michael Lothar Wolf It is certified that error appears in the above-identified patent and that said Letters Patent is hereby corrected as shown below:

In the Specification

Column 4, Line 26, reads "form external influences not connected to the operation of" and should read -- from external influences not connected to the operation of --.

Column 8, Line 62, reads "deflected from the second to direction to the first direction" and should read -- deflected from the second direction to the first direction --.

Column 12, Lines 33-34, read "fed in and of the gas discharged are determined depending on one, several or all of the parameters speed of the belt," and should read -- fed in and of the gas discharged is determined depending on one, several or all of the following parameters: speed of the belt, --.

In the Claims

At Claim 9, Column 13, Lines 10-13, read "a first mounting section rigidly mounted each cross strut to the first belt; and a second mounting section rigidly mounted each cross strut to the first belt." and should read -- a first mounting section rigidly mounting each cross strut to the first belt; and a second mounting section rigidly mounting each cross strut to the second belt. --.

Signed and Sealed this
Twentieth Day of February, 2018

Andrei Iancu
*Director of the United States Patent and Trademark Office*